Aug. 28, 1962
A. L. RAWLINGS
3,051,002
SEA LEVEL INDICATING BAROMETER
Filed June 23, 1959
3 Sheets-Sheet 1
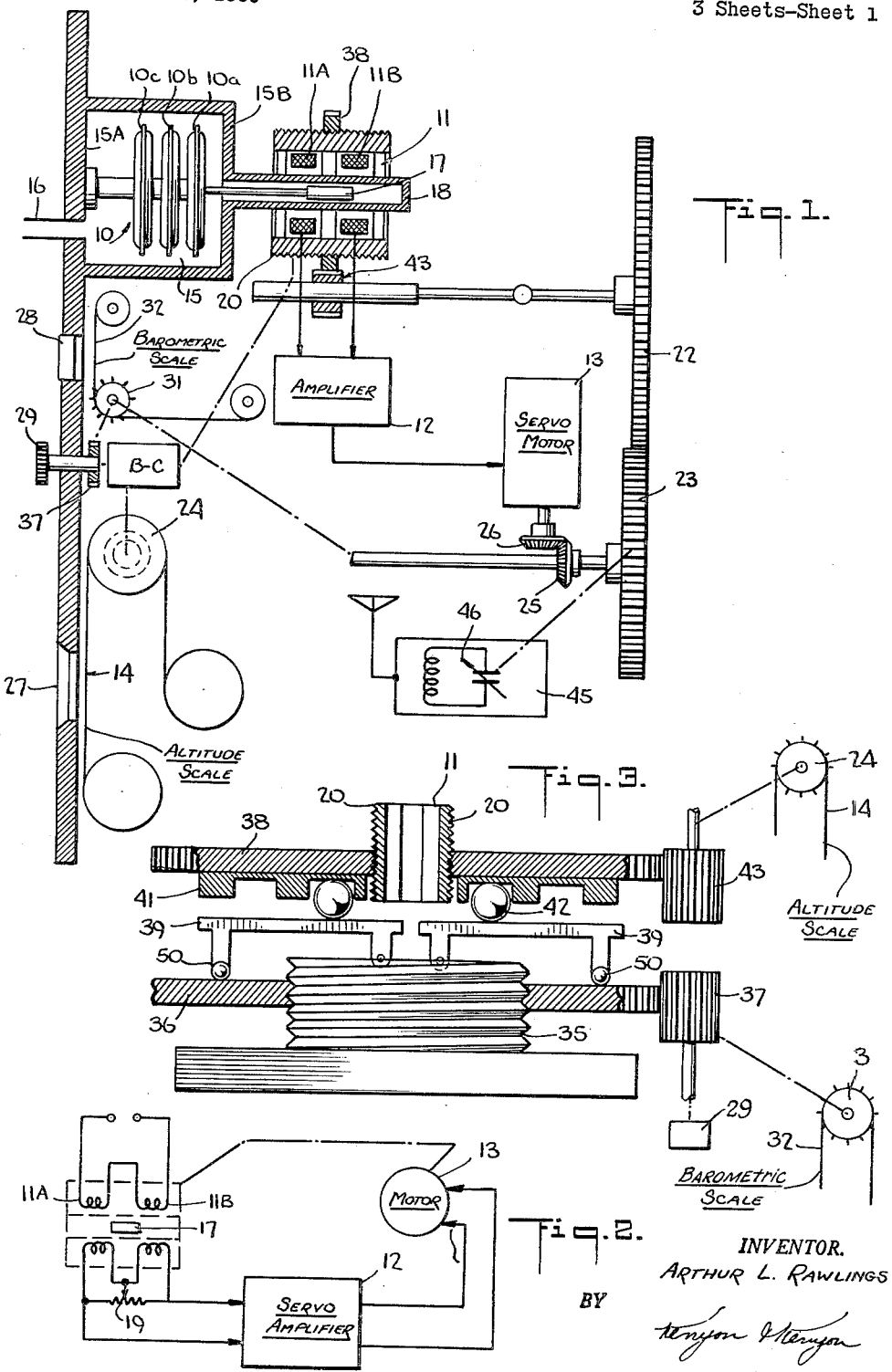
INVENTOR.
ARTHUR L. RAWLINGS
BY
ATTORNEYS Aug. 28, 1962 A. L. RAWLINGS 3,051,002
SEA LEVEL INDICATING BAROMETER
Filed June 23, 1959 3 Sheets-Sheet 2

INVENTOR.
ARTHUR L. RAWLINGS
BY
Kenyon & Kenyon
ATTORNEYS

Aug. 28, 1962

A. L. RAWLINGS 3,051,002

SEA LEVEL INDICATING BAROMETER

Filed June 23, 1959

INVENTOR.
ARTHUR L. RAWLINGS
BY
Kenyon & Kenyon
ATTORNEYS 3,051,002
SEA LEVEL INDICATING BAROMETER
Arthur L. Rawlings, Jamaica, N.Y., assignor to Bulova
Research and Development Laboratories, Inc., Woodside, N.Y., a corporation of New York
Filed June 23, 1959, Ser. No. 822,241
4 Claims. (Cl. 73—386)

The present invention relates generally to barometric instruments and more particularly to aneroid barometers which provide sea level readings regardless of the elevation of the instrument.

Barometric pressure is generally read by means of a mercury column operating in conjunction with a calibrated scale. At sea level, the standard barometric reading is 29.92 inches of mercury at 32° F. or 30 inches at 58° F. Aneroid barometers are often used in place of mercury tubes because of their compactness and portability. The conventional aneroid is constituted by an exhausted chamber with corrugated diaphragm walls, the collapse of which under atmospheric pressure is resisted by the walls. Deflections of the diaphragm which occur with changes in pressure are usually indicated or recorded by a lever mechanism. Aneroid barometers are calibrated in terms of inches of mercury, but those of conventional design lack the accuracy of mercury columns by reason of certain mechanical drawbacks such as friction and lag effects.

With conventional barometers, whether of the mercury tube or aneroid type, the local elevation of the instrument must be taken into account in determining the corresponding pressure at sea level. Ordinary barometers can only read mercury height at the instrument location and cannot directly measure sea level pressure unless the instrument happens to be positioned at that level. For instance, in New York city, which is just above sea level, the barometer generally fluctuates relative to a mean reading of 30 inches, whereas at Denver, which is 5,000 ft. higher in elevation, the mean will be about 25 inches.

Thus, with existing instruments, it is necessary to provide a corrected barometer reading. The corrected reading is the observed reading corrected for elevation and instrument calibration. To correct the observed reading of a barometer to the equivalent reading at a higher elevation, it is the standard practice to subtract predetermined values in inches of mercury for each 1,000 foot difference in elevation. For positions below sea level, the values are added rather than subtracted. These calculations are carried out by means of standard tables.

An accurate knowledge of the sea level barometer is required for many purposes. For example, the Weather Bureau has barometers placed at various stations throughout the country but has to reduce all of their readings to sea level for making weather maps. This is a time-consuming operation depending on empirical expressions for each station and arbitrary constants depending on the temperature. Airborne altimeters must also be corrected on the basis of sea level barometric values, and the flight control towers of airports have constantly to signal the sea level pressure to aircraft for use in adjusting their altimeters. Thus, with conventional barometers, unless the location is at sea level, a computation has to be made before a true reading is available.

In view of the foregoing, it is the principal object of the present invention to provide an aneroid barometer which at any local altitude will automatically indicate what a mercury barometer would read according to conventional assumptions if it were positioned at sea level vertically below the actual site of the instrument. An instrument in accordance with the invention may be placed in an unattended weather station where it will continuously indicate and, if necessary, transmit to a distant point the sea level pressure corresponding to the local pressure at that station.

More particularly, it is an object of the present invention to provide a barometric instrument which may be installed at any altitude and which may be manually set to the particular altitude value so as to provide sea level barometric readings automatically corrected according to conventional assumptions for altitude and temperature. An important advantage of this instrument is that it may readily be reset for other altitudes so that instead of being usable merely at only one station, it can be taken to any location and any height.

Also an object of this invention is to provide a small, portable aneroid barometer of efficient and reliable design providing continuous indications of sea level pressure which can be read off without calculation and transmitted to aircraft or other points as a continuously repeated signal.

For a better understanding the invention, as well as other objects and further features thereof, reference is had to the following detailed description to be read in conjunction with the accompanying drawings, wherein like components in the several views are identified by like reference numerals.

In the drawings:

FIG. 1 is a block diagram illustrative of the fundamental principles underlying the invention.

FIG. 2 is a schematic diagram of the electrical control circuit of the instrument.

FIG. 3 is a diagrammatic showing of the barometric correction mechanism incorporated in the instrument.

Figure 4:
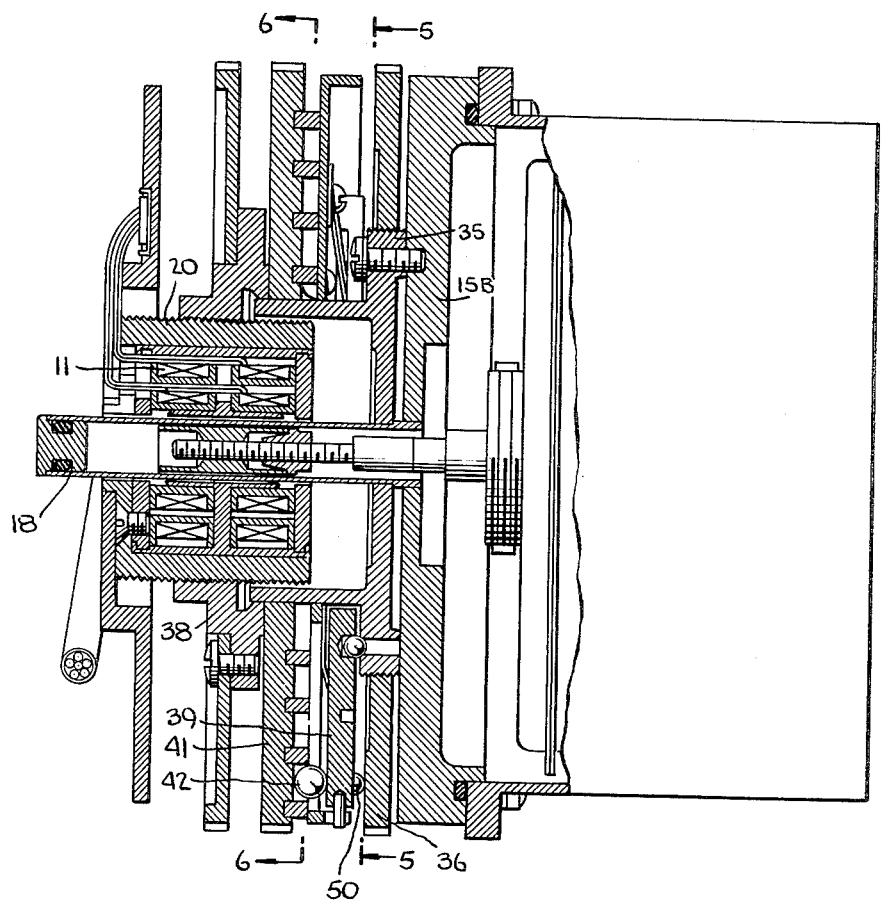
FIG. 4 is a longitudinal section taken through an instrument in accordance with the invention.

Referring now to the drawings, the barometric instrument in accordance with the invention comprises a barometric pressure-sensing unit 10, a magnet detector 11 for the sensing unit, an amplifier 12 coupled to the detector, and a servo motor 13 controlled by said amplifier and adapted to shift the position of the detector 11 to a null point and simultaneously to drive a sea level calibrated tape indicator 14.

Pressure-sensing unit 10 is constituted by a stacked assembly of three capsules 10a, 10b and 10c, which are joined together serially at their center hubs. The sensing unit is mounted within a chamber 15. Outside pressure to be measured is communicated to the chamber by way of a tube 16.

The stack of capsules is supported only at one end where it is fixedly secured to one end wall 15a of the chamber, whereby the stack is unloaded and free to expand and contract. Carried at the free end of the stack is a ferromagnetic or soft iron slug 17 which reciprocates axially within a tubular extension or stalk 18. The extension is fabricated of non-magnetic material and projects from chamber 15 in communication therewith.

The capsules are individually evacuated and preferably are of the concentrically corrugated diaphragm type disclosed in the patent to Melchior No. 2,760,260. By a method of diaphragm forming, the heat treatment and cold working, optimum capsule characteristics are obtained. Corrosion-resistant material is preferably used in fabricating the capsules. One useful material for this purpose is the nickel alloy "Ni-span-C" manufactured by the International Nickel Company.

In a practical embodiment of the invention, a change in pressure of one atmosphere or 30 inches of mercury causes a single capsule in the stack to change its axial length by one-eighth of an inch. Since three capsules 10a, 10b and 10c are connected in series, the total stroke is three-eighths of an inch for a change in altitude from sea level up to infinite feet. In practice, therefore, considerable multiplication must be effected between the capsule motion and the indicator. In accordance with the invention, the multiplication is produced without imposing any load, frictional or otherwise, on the capsules themselves.

This is accomplished by using the magnetic detector 11 to measure capsule expansion and contraction. Magnetic detector 11 is constituted by a differential transformer having a pair of coils 11A and 11B which surround tube 18 at spaced locations thereon. Increasing pressure causes expansion of the capsules in the sensing assembly, thus moving slug 17 through the center of the coils, whereas decreasing pressure causes contraction and movement of the armature in the opposite direction.

As best seen in FIGS. 1 and 2, each of coils 11A and 11B is constituted by a primary winding and a secondary winding forming a transformer in conjunction with slug 17. The primary windings are serially connected to a common source of alternating current. Maximum voltage is induced in a secondary winding of a given transformer when the associated slug is fully inserted therein to provide a high permeability path between primary and secondary. However, when the slug is fully inserted in say transformer 11A, it is entirely withdrawn from the other transformer 11B of the pair and the induced voltage in the latter is at its minimum value. But when slug 17 occupies a mid-position between transformers, the voltages induced in the secondaries are exactly equal and opposite, such that when the core is displaced from mid-position, the sum of voltages has relative magnitude depending on the extent of displacement, and a phase depending on direction.

The secondaries of coils 11A and 11B are serially connected in opposition as a control circuit to the input of servo amplifier 12. Connected across these secondaries is a balancing potentiometer 19 whose adjustable tap is connected to the junction of the secondaries. With this arrangement the output of the secondaries can only be kept in balance when the slug 17 occupies a null position between them, hence any change from null position because of pressure changes will generate an alternating-current signal in one direction or the other.

The output from the secondary windings acts to control servo motor 13 in a direction and to an extent restoring the coils 11A and 11B to the null position with respect to the displaced slug 17. The motor also acts to move the sea level pressure scale 14 proportionally.

Coils 11A and 11B are carried in a sleeve 20 which is caused to traverse to the right or left by a shaft mounted pinion 21, operated through gears 22 and 23 by motor 13. The motor also drives the sprocket wheel 31 for the sea level barometric scale 32 through bevel gears 25 and 26. The movement of the tape 32 past the window 28 thus reproduces the displacement of the coils 11A and 11B due to incorrect setting of the sea level barometer.

Also provided is an altitude scale 14 which is calibrated in elevational values and is exposed to view through a window 28, the scale position being manually adjusted by a knob 29 which is operatively coupled through a barometric correction device 30 (to be later described) to the sprocket wheel 24 for the altitude tape 14 and to the coil frame 20. Rotation of knob 29 acts to zero-set the coils relative to slug 17 for the local elevation, the barometric correction device 30 introducing a correction appropriate to the local altitude.

The sea level barometric scale 32 is preferably graduated from 28.00 to 31.00 inches of mercury, and the altitude scale 14 is calibrated in feet.

It is essential to introduce into the instrument a correction based on the momentary atmospheric pressure at the local altitude. In accordance with the invention, a barometric correction device, indicated generally by block 30 in FIG. 1, is provided which automatically computes the product of two factors and introduces this product to the observed barometric reading by shifting the windings of the differential transformer 11A and 11B of magnetic detector 11 axially with respect to armature 17.

The two factors whose product is computed are (a) a factor determined by the local elevation of the instrument relative to sea level and (b) a factor depending on the difference between 29.92 and the sea level pressure.

Figure 5:
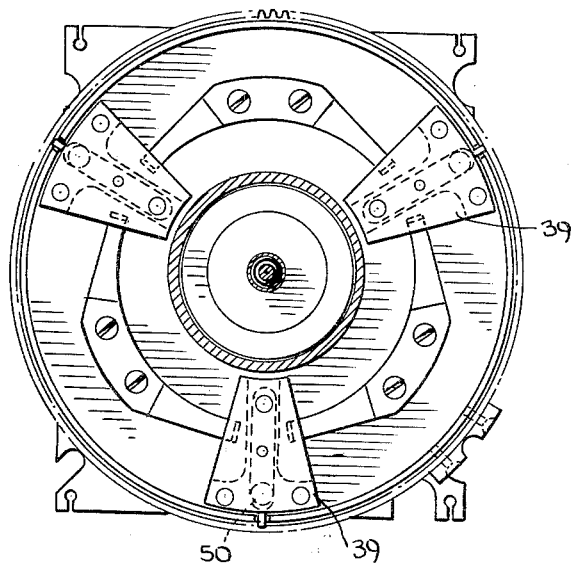
FIG. 5 is a transverse section taken through the plane of lines 5—5 in FIG. 4.
Figure 6:
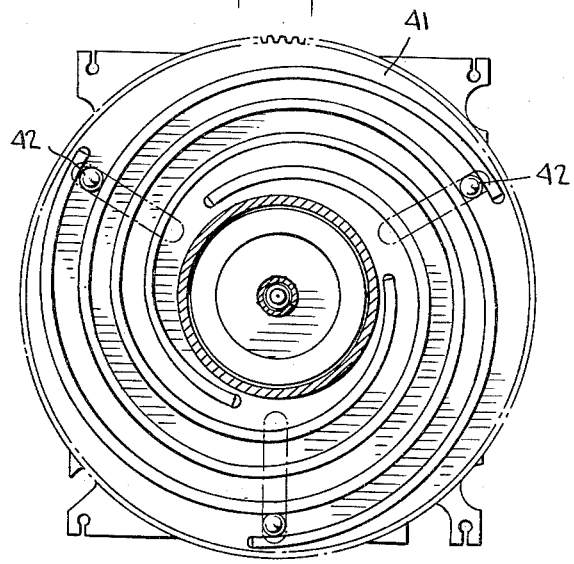
FIG. 6 is a transverse section taken through the plane of lines 6—6 in FIG. 5.

The correction mechanism is illustrated diagrammatically in FIG. 3 and structurally in FIGS. 4, 5 and 6, where the element 35 is a fixed screw mounted on the other end wall 15B of the capsule chamber 15. Turning on screw 35 is a nut 36 having a toothed edge which can be rotated by operation of the servo motor through a pinion 37. Levers 39 are hinged on top of screw 35 with their outer ends engaging nut 36 through balls 50.

It will be evident that when the motor 13 is turned this will cause nut 36 to ride up or down screw 35 depending on the turning direction and thereby simultaneously change the slope of levers 39 relative to the nut.

The differential transformer 11A–11B constituting the magnetic detector 11 for the sensing unit is mounted within the externally threaded sleeve 20 and is slidable along the tube 18. Threadably received on sleeve 20 is a nut 38. Pressing against nut 38 is a scroll plate 41 having spiral grooves acting as a track for balls 42 lying against levers 39. In practice, three balls are used and three levers spaced 120 degrees apart. The periphery of nut 38 is toothed and is driven by a pinion 43. Rotation of the scroll plate 41 causes balls 42 to move radially along levers 39, the balls always being equidistant from the lever hinges, which distance is proportional to actual barometric pressure at the station.

Thus, when nut 36 turns on fixed screw 35 it pushes balls 50 and levers 39 upward. Levers 39 push balls 42 against the scroll plate 41 and this pushes nut 38, which axially moves sleeve 20 with it as well as the coils 11A and 11B within the sleeve.

Pinion 43 which drives nut 38 is operatively coupled to the sprocket wheel 24 which transports the altitude tape scale 14. Hence pinion 43 is turned according to the altitude of the station. Sleeve 20 is free to move axially but cannot rotate. Therefore the height of sleeve 20 relative to the nut 38 is controlled by the manually set local elevation. Pinion 37 which operates the nut 36 is operatively coupled to sprocket wheel 31 which transports the sea level pressure scale 32.

It will be seen that if knob 29 is manually set to the local elevation and if pinion 43 is turned in accordance with the said elevation of the instrument, then the nut 38 and the detector coils 11A and 11B transported thereby will be raised or lowered with reference to the end wall 15b by a distance depending on the steepness of the hills of levers 39 and on the distance the balls have been rolled up these hills by rotation of nut 38.

Thus the position assumed by the detector 11 is the resultant product of the two factors mentioned above and the barometric correction takes into account both the local elevation of the instrument and the difference between the computed sea level pressure and the standard 29.92.

In operation, the knob 29 is turned to cause scale 14 to read the local elevation of the instrument. This displaces the magnetic system to drive the barometric scale 32 to indicate sea level pressure. In order to provide a clearly visible reading, the scale 32 may be made of translucent film material and the reading thereof optically projected on a ground glass screen, the film being illuminated by a suitable light bulb.

The mechanical details of the barometric-correction device, the capsules, the magnetic detector and the servo system as well as the scale mechanisms, are similar to those disclosed in the copending application of Fischer, entitled "Acceleration-Compensated Altimeter," filed April 21, 1959, Serial No. 807,782. Temperature compensation is effected by matching the thermal coefficient of expansion of the chamber 15 with that of the capsules.

The reading of the barometric scale may be transmitted by the telemetering system to a remote point. This system may, for example, be constituted by a radio or carrier signal transmitter 45 having a resonant circuit 46, whose operating frequency is varied by the servo system to provide a signal whose frequency reflects the setting of the barometric scale. In this way the barometric reading at a remote, unattended weather station may be transmitted to a central point.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A barometric instrument comprising a pressure-sensitive unit, means to detect the movement of the unit to produce an indicating signal, a barometric indicating device responsive to said signal to provide readings of barometric pressure, an externally adjustable scale calibrated in terms of elevation above sea level, a barometric correction mechanism operatively coupled both to said adjustable scale and said barometric indicating device including means to compute the product of a first factor determined by the local elevation of the instrument relative to sea level at the instrument location and a second factor depending on the momentary pressuer of the instrument at said local elevation to provide a correction value, and means coupled to said mechanism to correct said indicating device in accordance with the computed value to provide sea level pressure readings.

2. A barometric instrument providing sea level readings regardless of the elevation of the unit at a given location, comprising a pressure-sensitive aneroid unit, magnetic means to detect the movement of the instrument to produce an indicating signal, a barometric sea level pressure indicating device responsive to said signal to provide readings of barometric pressure, an externally adjustable scale calibrated in terms of elevation above sea level, a barometric correction mechanism operatively coupled both to said adjustable scale and said barometric indicating device including means to compute the product of a first factor determined by the local elevation of the instrument relative to sea level at the instrument location and a second factor depending on the difference between 29.92 and the sea level pressure to produce a correction value, and means coupled to said mechanism automatically to correct said indicating device in accordance with the computed value to provide direct sea level pressure readings.

3. A barometric instrument providing sea level pressure readings regardless of the elevation of the instrument at a given location, said instrument comprising an aneroid unit, a chamber for housing said unit having a stalk extending therefrom, a magnetic slug attached to said unit and reciprocal in said stalk in accordance with changes in pressure, a magnetic detector slidably mounted on said stalk and constituted by a differential transformer producing a control signal which depends on the relative position of the slug relative thereto, a servo system responsive to the output of said transformer and operatively coupled to said detector to shift the position thereof in a direction and to an extent establishing a null, a sea level pressure scale operatively coupled to said servo system to provide barometric pressure readings, control means including a barometric correction mechanism to set the initial position of said detector on said stalk in accordance with the elevation of said instrument, an externally adjustable altitude scale to indicate the set elevation of the control means, said barometric correction mechanism including means operatively coupled both to said adjustable scale and said detector to compute the product of a first factor determined by the local elevation relative to sea level, and a second factor depending on the difference between 29.92 and the sea level pressure to produce a correction value, and means coupled to said mechanism to correct the initial position of said detector in accordance with said computed value.

4. A barometric instrument providing sea level pressure readings regardless of the elevation of the instrument at a given location, said instrument comprising an aneroid unit, a chamber for housing said unit and having a stalk extending therefrom, a magnetic slug attached to said unit and reciprocal in said stalk in accordance with changes in pressure, a magnetic detector slidably mounted on said stalk and constituted by a differential transformer producing a control signal which depends on the relative position of the slug relative thereto, a servo system responsive to the output of said transformer and operatively coupled to said detector to shift the position thereof in a direction and to an extent establishing a null, a sea level pressure scale operatively coupled to said servo system to provide barometric pressure readings, control means including a barometric correction mechanism to set the initial position of said detector on said stalk in accordance with the elevation of said instrument, an externally adjustable altitude scale to indicate the set elevation of the control means, said barometric correction mechanism including means operatively coupled both to said adjustable scale and said detector to compute the product of a first factor determined by the local elevation relative to sea level, and a second factor depending on the difference between 29.92 and sea level pressure to produce a correction value, and means coupled to said mechanism to correct the initial position of said detector in accordance with said computed value, said mechanism including a fixedly mounted screw, a first nut threadably received on said screw and advanced thereon in accordance with the value of said elevation, a lever hingedly mounted on the screw, a scroll plate having a spiral track for receiving a ball which rides on said lever, a second nut engaging said scroll plate for axial movement therewith and threadably engaging said detector whereby the longitudinal position of said second nut is shifted relative thereto, and means to rotate said second nut in accordance with the momentary local atmospheric pressure.

References Cited in the file of this patent
UNITED STATES PATENTS

| 2,276,334 | Peterson | Mar. 17, 1942 |
| 2,969,675 | Fischer | Jan. 31, 1961 |

OTHER REFERENCES

Aviation Week, article by Henry Lefer under "Aeronautical Engineering" Section; Dec. 5, 1955. (Copy in Patent Office Scientific Library.)